United States Patent
Welschof

(10) Patent No.: US 7,514,805 B2
(45) Date of Patent: Apr. 7, 2009

(54) DRIVE AXLE HAVING AN ELECTRICAL CONVERTER

(75) Inventor: Bernward Welschof, Großostheim (DE)

(73) Assignee: Linde Material Handling GmbH, Aschaffenburg (DE)

( * ) Notice: Subject to any disclaimer, the term of this patent is extended or adjusted under 35 U.S.C. 154(b) by 167 days.

(21) Appl. No.: 11/501,480

(22) Filed: Aug. 9, 2006

(65) Prior Publication Data

US 2007/0048150 A1    Mar. 1, 2007

(30) Foreign Application Priority Data

Aug. 10, 2005    (DE) ...................... 10 2005 037 726

(51) Int. Cl.
*B60P 1/00* (2006.01)
(52) U.S. Cl. ........................................................ 290/2
(58) Field of Classification Search .................... 290/2
See application file for complete search history.

(56) References Cited

U.S. PATENT DOCUMENTS

| | | | | |
|---|---|---|---|---|
| 1,828,992 A * | 10/1931 | Atteslander | .................. | 105/35 |
| 1,839,921 A * | 1/1932 | Herr | .............................. | 290/3 |
| 1,978,080 A * | 10/1934 | Giger | ........................... | 105/49 |
| 2,113,207 A * | 4/1938 | Yingling | ........................ | 290/3 |
| 2,899,005 A * | 8/1959 | Speicher | ...................... | 180/10 |
| 3,479,967 A * | 11/1969 | Crompton | .................... | 105/53 |
| 4,196,785 A * | 4/1980 | Downing, Jr. | .............. | 180/6.28 |
| 4,867,072 A * | 9/1989 | Kleim et al. | ................. | 105/133 |
| 5,363,937 A * | 11/1994 | James | ........................ | 180/192 |
| 5,793,145 A * | 8/1998 | Avakian et al. | ............. | 310/270 |
| 6,308,639 B1 * | 10/2001 | Donnelly et al. | .............. | 105/50 |
| 6,397,759 B1 * | 6/2002 | Hubert et al. | ............ | 105/26.05 |
| 6,740,002 B1 * | 5/2004 | Stridsberg | ..................... | 477/14 |
| 7,025,158 B2 | 4/2006 | Kanzler et al. | | |
| 2002/0175009 A1 * | 11/2002 | Kress | ......................... | 180/65.2 |
| 2005/0072608 A1 | 4/2005 | Johnston et al. | | |
| 2005/0279243 A1 * | 12/2005 | Bendig et al. | ............ | 105/26.05 |
| 2006/0065453 A1 * | 3/2006 | Morrow et al. | ............. | 180/65.2 |
| 2007/0036663 A1 * | 2/2007 | Welschof | ..................... | 417/364 |
| 2008/0023237 A1 * | 1/2008 | Houle | ........................ | 180/65.2 |

FOREIGN PATENT DOCUMENTS

| | | |
|---|---|---|
| DE | 17 88 182 A1 | 11/1976 |
| DE | 296 07 651 U1 | 10/1997 |
| DE | 102 11 193 A1 | 9/2003 |
| DE | 103 25 127 A1 | 12/2004 |
| EP | 1 391 370 A1 | 2/2004 |
| EP | 1391370 A1 | 2/2004 |
| JP | 2000299901 A | 10/2000 |
| JP | 2005163605 A | 6/2005 |
| WO | 9409548 A1 | 4/1994 |
| WO | WO 94/09548 A1 | 4/1994 |

* cited by examiner

*Primary Examiner*—Joseph Waks
(74) *Attorney, Agent, or Firm*—The Webb Law Firm

(57) ABSTRACT

A drive axle for a working machine, in particular an industrial truck, has at least one electrical traction motor (1 or 2) and a second electrical machine, the traction motor (1 or 2) being arranged in the axial direction. In order to extend the field of use of the drive axle, according to the invention, the second electrical machine is electrically connected to the traction motor (1 or 2) and forms, together with the traction motor, an electrical converter. The second electrical machine is drive-connected to a combustion engine (12) and is provided as the generator (11) of the electrical converter.

13 Claims, 1 Drawing Sheet

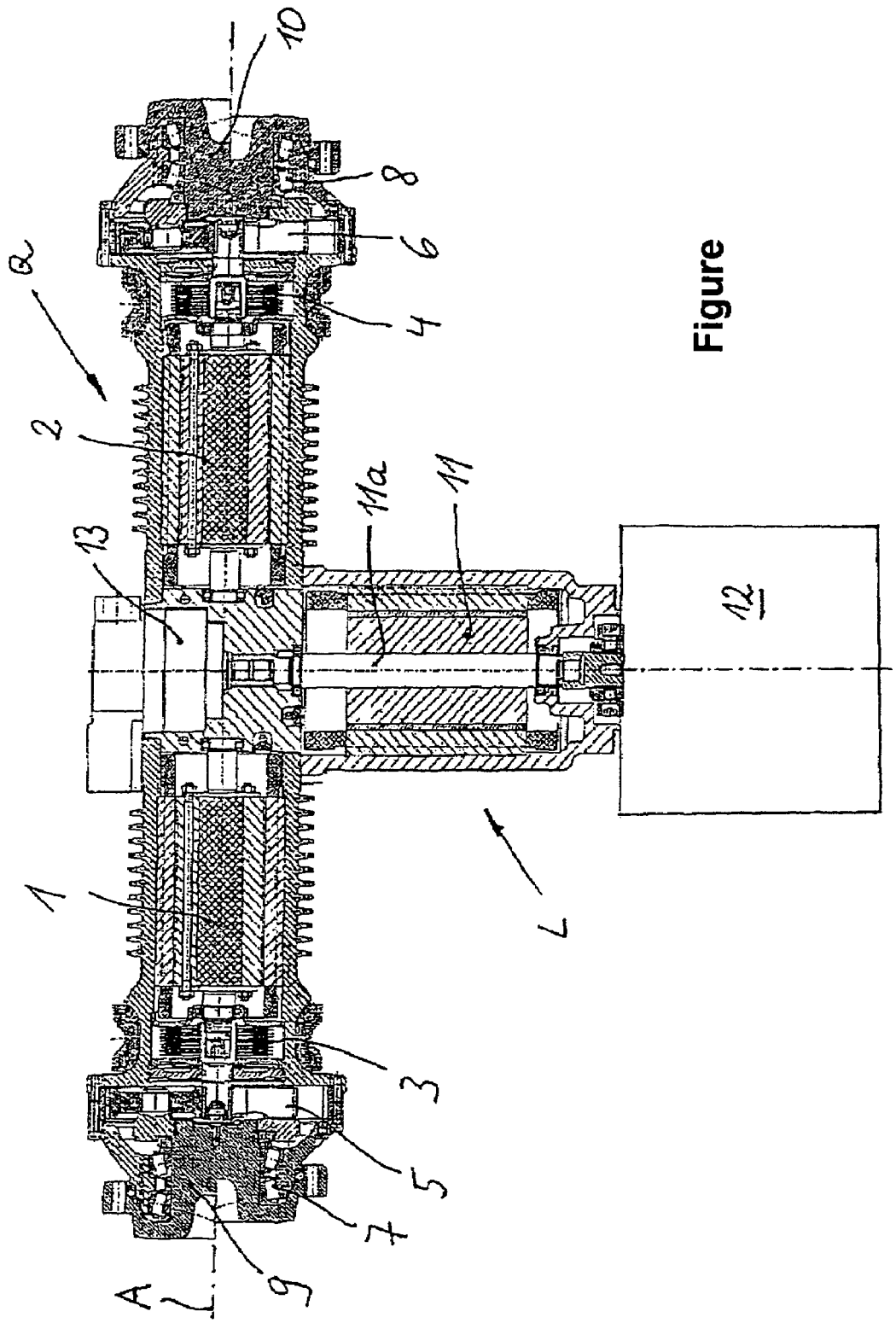
Figure

DRIVE AXLE HAVING AN ELECTRICAL CONVERTER

CROSS-REFERENCE TO RELATED APPLICATION

This application claims priority to German Application No. 10 2005 037 726.2, filed Aug. 10, 2005, which application is herein incorporated by reference in its entirety.

BACKGROUND OF THE INVENTION

1. Field of the Invention

The invention relates to a drive axle for a working machine, in particular an industrial truck, having at least one electrical traction motor and a second electrical machine, the traction motor being arranged in the axial direction.

2. Technical Considerations

A generic drive axle is disclosed in DE 102 11 193 A1. In this case, a traction motor is arranged coaxially with respect to the axle center line within the drive axle, i.e., in the axial direction. The traction motor is coupled to a differential gear, whose two outputs are each connected to one of the wheel hubs provided on the axle ends. A bypass gear is arranged in the force flow between one of the outputs of the differential gear and the associated wheel hub, with the aid of which bypass gear the force flow is bypassed and space for a second electrical machine, namely an electric motor of a working hydraulics pump, is created in the region of the bypass gear on the axle center line.

In addition, DE 103 25 127 A1 discloses a generic drive axle, in the case of which, in accordance with a preferred exemplary embodiment, two traction motors are arranged in the drive axle and an electric motor of a working hydraulics pump is located axially therebetween.

These known drive axles are envisaged for use in industrial trucks which are operated electrically using a battery.

SUMMARY OF THE INVENTION

The present invention is based on the object of providing a generic drive axle whose field of use has been extended.

This object is achieved, according to the invention, by the fact that the second electrical machine is electrically connected to the traction motor and forms, together with the traction motor, an electrical converter, the second electrical machine being drive-connected to a combustion engine and being provided as the generator of the electrical converter.

A concept of the invention, therefore, includes forming an electrical converter from an electrical drive axle which has an electrical traction drive and an electrical additional drive, i.e., an electrical compact axle, within which torque and rotation speed conversion takes place. In this case, the electric motor of the additional drive known from the art is used as a generator which is driven by a combustion engine and supplies the at least one traction motor with electrical energy.

According to the invention, a drive axle which is provided for battery-electric working machines can, therefore, surprisingly also be used as the traction drive for a diesel-electric working machine. In this case, for example, a considerable rationalization effect results for fork-lift trucks because, in principle, the same drive axle is therefore used both in the case of battery-electric stackers and in the case of diesel-electric stackers. The axle connection to the vehicle frame, the axle width, possibly the lifting mast connection, and further parameters can be identical in this case.

The drive axle according to the invention is compact and, furthermore, is robust owing to the integrated design, in which all essential components are accommodated in a protected manner, and it can be used in an unlimited manner even under unfavorable environmental conditions.

If, in one development of the invention, the generator is arranged coaxially with respect to the combustion engine and, together with the combustion engine, is arranged at right angles to a transverse section of the drive axle, an optimum, space-saving design for vehicles with a longitudinally installed combustion engine results.

In one advantageous refinement of the invention, two traction motors are provided, which are arranged one behind the other and are each associated with a wheel. The generator is located in a region in which the traction motors are adjacent to one another. A T-shaped electrical compact axle, which has a largely symmetrical design, therefore results.

In this case, the generator can be arranged at least partially axially between the two traction motors, which saves space in the longitudinal direction of the vehicle.

In both cases, it is possible for the generator to have a continuous drive shaft, which is drive-connected to a pump at the end remote from the combustion engine. In this manner, it is possible for the combustion engine to drive a further load, in addition to the traction drive.

The pump can be arranged at least partially axially between the traction motors.

The pump is expediently connected to working hydraulics.

If the traction motor and the generator are connected to a cooling liquid cycle, all thermally-sensitive components of the compact axle, from the power controllers, through the electrical machines, their mounts and shaft sealing rings to the gears, wheel mounts, etc., can be cooled in optimum fashion. A higher power can be transmitted using the electrical converter than using air-cooled drive units.

Owing to the temperature reduction achieved as a result of the liquid cooling in the electrical machines, improvements are made in terms of efficiency.

Improved cooling also allows for a higher current density and, therefore, a lower current level. As a result, power controllers for the electrical machines can be used which heat up to a lesser extent and may have a smaller, i.e., more cost-effective, design.

The cooling liquid cycle is advantageously connected to working hydraulics of the working machine. A liquid cycle, which is already provided in the working machine, is therefore used, including the cooling device which is generally provided there.

Particularly advantageous is a refinement of the invention in accordance with which the electrical converter has an operating voltage of more than 100 volts, in particular more than 200 volts. Owing to the operating voltage, which is higher than in the case of known electrical traction drives for working machines, the torque of the electrical traction motor or the electrical traction motors is significantly increased. It is, therefore, possible to reduce the rotation speed. As a result, liquid cooling is more easily possible since the churning losses occurring at high rotation speeds and which occur in particular when the rotors of the electrical machines rotate in cooling liquid are drastically reduced.

The reduction in the rotation speed owing to increased operating voltage also makes it possible to simplify the assemblies adjacent to the traction motor or traction motors (reduction gear, wheel mounts, brakes, housing). For example, depending on the design, it may be possible, under certain circumstances, to dispense with a downstream reduction gear or for this reduction gear merely to have a single-stage design.

Since the components of the electrical converter which are subjected to an increased operating voltage are accommodated within the compact axle and are, therefore, hidden, reliable operation of the drive axle according to the invention is achieved.

For the case in which, as has been mentioned initially, the drive axle according to the invention is also used in battery-electric working machines, in this case the generator being provided as an additional drive motor, the battery voltage can be raised to the increased operating voltage by a step-up converter, such that identical electrical machines and power controllers can be used in both application cases of the drive axle.

BRIEF DESCRIPTION OF THE DRAWING

Further advantages and details of the invention will be explained in more detail with reference to the exemplary embodiment illustrated in the schematic figure, which is a cross-sectional view of a drive axle incorporating features of the invention.

DESCRIPTION OF THE PREFERRED EMBODIMENTS

In the illustrated exemplary embodiment, the drive axle according to the invention has two electrical traction motors 1, 2, which are arranged axially one behind the other in the axial direction and are spaced apart from one another. The two traction motors 1, 2, which are preferably in the form of three-phase synchronous motors or in the form of three-phase asynchronous motors, each have a multiple-disc brake 3 and 4, respectively, and a reduction gear 5 and 6, respectively, connected downstream of them. The reduction gear can be in the form of a single-stage planetary gear. In each case, one wheel mount 7 or 8 of a wheel hub 9 or 10 is located at the axle ends.

The traction motors 1, 2 and the downstream components are arranged coaxially with respect to an axle center line A. An arrangement is, of course, also possible in which the axle center line A is offset with respect to the drive shafts of the traction motors 1, 2, for example when spur gears are used in place of planetary gears as the reduction gear 5 or 6. It goes without saying that an individual traction motor can also be arranged in the drive axle in place of two electrical traction motors 1, 2, in this case a differential gear being connected downstream of the individual traction motor, the two outputs of the differential gear each being connected to one of the wheel hubs 9 or 10.

The drive axle has a further electrical machine which is arranged in the center of the axle and at right angles with respect to the traction motors 1, 2. In this case, it is an electrical machine which is provided as the generator 11, which is electrically connected to the two traction motors 1, 2 and, together with the traction motors 1, 2, forms an electrical converter. The generator 11 is arranged coaxially with respect to a combustion engine 12 and is drive-connected to it.

The drive axle is, therefore, in the form of a T and comprises a transverse section Q, which is essentially formed by the traction motors 1, 2 (and the downstream components), and a longitudinal section L, namely the generator 11. This design, which can also be referred to as an electrical compact axle owing to the integration of an electrical converter as the traction drive, is primarily suitable in the case of a horizontally installed combustion engine 12. In principle, other designs are, of course, also possible, in which the generator 11 is arranged, for example, parallel to the traction motors 1, 2. A variant embodiment with only one traction motor and one generator, which is arranged coaxially with respect thereto, is also conceivable.

A drive shaft 11*a* of the generator 11 has a continuous design and is connected to a pump 13, which is located axially between the two traction motors 1, 2 in the drive axle. It is also possible for the generator 11 to be arranged at least partially axially between the traction motors 1, 2, in which case the pump 13, which is arranged in series behind this, protrudes out of the transverse section of the drive axle formed by the traction motors 1, 2. The pump 13 is preferably part of the working hydraulics of a working machine equipped with the drive axle, for example a fork-lift truck.

The working hydraulics are preferably also used for cooling the compact axle. In this case, a cooling cycle is connected to the working hydraulics and supplies the generator 11 and the traction motors 1, 2, as well as the downstream components, with cooled hydraulic liquid from the working hydraulics. In this case, it is possible to directly cool the electrical machines by the rotors dipping into hydraulic oil, or to cool them indirectly by cooling channels being provided in the housing or other machine areas. The liquid cooling brings about a reduction in the temperature in the electrical machines and, therefore, improves efficiency.

The figure does not illustrate power controllers (power modules) which can be flange-connected onto the drive axle and can be used to control the rotation speed and torque of the electrical converter. The power controllers are also connected to the cooling liquid cycle (directly or indirectly).

For cooling purposes, a liquid cycle, which is already provided in the working machine, and its cooling devices (oil coolers, possibly fans) is therefore used. The cooling, as is illustrated, can be assisted by fluting of the drive axle.

In combination with the liquid cooling, it is particularly favorable if the electrical converter is operated at an operating voltage of more than 100 volts, in particular more than 200 volts. In this case, for example, an operating voltage of 400 volts is easily possible. The increased operating voltage makes it possible to increase the torque of the electrical traction motors 1, 2 and, therefore, to reduce the output drive rotation speed. The churning losses occurring at high-rotation speeds during liquid cooling are avoided, or considerably reduced in the case of the present drive axle, since it is possible for the rotation speed of the electrical machines to be considerably reduced, owing to the high-operating voltage and the high torque, which is achieved as a result.

The reduction in rotation speed owing to the increased operating voltage also makes it possible for the reduction gear, as in the present exemplary embodiment, only to have a single-stage design or to be dispensed with completely, under certain circumstances. The churning and frictional losses in the multiple-disc brakes are also reduced.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A drive axle for a working machine, comprising:
   at least one electric traction motor and a second electrical machine, the traction motor being arranged on a transverse section of the drive axle in an axial direction with respect to a centerline of the drive axle, and at least a portion of the second electrical machine being arranged on a longitudinal section of the drive axle, wherein the second electrical machine is electrically connected to the traction motor and forms, together with said traction motor, an electrical converter, and wherein the second electrical machine is drive-connected to a combustion engine and is provided as a generator of the electrical converter.

2. The drive axle according to claim 1, wherein the generator is arranged coaxially with respect to the combustion engine and, together with said combustion engine, is arranged at right angles to the transverse section of the drive axle.

3. The drive axle according to claim 2, wherein two traction motors are provided which are arranged one behind the other and are each associated with a wheel, and the generator is located in a region in which the traction motors are adjacent to one another.

4. The drive axle according to claim 3, wherein the generator is arranged at least partially axially between the two traction motors.

5. The drive axle according to claim 1, wherein the traction motor and the generator are connected to a cooling liquid cycle.

6. The drive axle according to claim 5, wherein the cooling liquid cycle is connected to working hydraulics of the working machine.

7. The drive axle according to claim 1, wherein the electrical converter can be operated at an operating voltage of more than 100 volts.

8. The drive axle according to claim 1, wherein the electrical converter can be operated at an operating voltage of more than 200 volts.

9. A drive axle for a working machine, comprising:
at least one electric traction motor and a second electrical machine, the traction motor being arranged in an axial direction with respect to a centerline of the drive axle, wherein the second electrical machine is electrically connected to the traction motor and forms, together with said traction motor, an electrical converter, wherein the second electrical machine is drive-connected to a combustion engine and is provided as a generator of the electrical converter, wherein the generator is arranged coaxially with respect to the combustion engine and, together with said combustion engine, is arranged at right angles to a transverse section of the drive axle, wherein two traction motors are provided which are arranged one behind the other and are each associated with a wheel, and the generator is located in a region in which the traction motors are adjacent to one another, and wherein the generator has a continuous drive shaft, which is drive-connected to a pump at an end remote from the combustion engine.

10. The drive axle according to claim 9, wherein the pump is arranged at least partially axially between the traction motors.

11. The drive axle according to claim 10, wherein the pump is connected to working hydraulics.

12. The drive axle according to claim 9, wherein the pump is connected to working hydraulics.

13. A drive axle for a working machine, comprising:
at least one electric traction motor and a second electrical machine, the traction motor being arranged in an axial direction with respect to a centerline of the drive axle, wherein the second electrical machine is electrically connected to the traction motor and forms, together with said traction motor, an electrical converter, wherein the second electrical machine is drive-connected to a combustion engine and is provided as a generator of the electrical converter, wherein the generator is arranged coaxially with respect to the combustion engine and, together with said combustion engine, is arranged at right angles to a transverse section of the drive axle, wherein two traction motors are provided which are arranged one behind the other and are each associated with a wheel, and the generator is located in a region in which the traction motors are adjacent to one another, wherein the generator is arranged at least partially axially between the two traction motors, and wherein the generator has a continuous drive shaft, which is drive-connected to a pump at an end remote from the combustion engine.

* * * * *